United States Patent Office 3,073,804
Patented Jan. 15, 1963

3,073,804
TEREPHTHALIC ACID DIGLYCIDE ESTER, RESINOUS CONDENSATION PRODUCTS OF TEREPHTHALIC ACID DIGLYCIDE ESTER, AND PROCESS FOR THEIR PRODUCTION
Bernhard Raecke and Rudolf Kohler, Dusseldorf, Germany, and Helmut Pietsch, Geneva, Switzerland, assignors to Henkel & Cie. G.m.b.H., Dusseldorf-Holthausen, Germany, a corporation of Germany
No Drawing. Original application Nov. 26, 1958, Ser. No. 776,449. Divided and this application Nov. 15, 1960, Ser. No. 75,650
7 Claims. (Cl. 260—78.4)

This application is a continuation-in-part of our copending applications, Serial No. 380,133, filed September 14, 1953, issued as Patent No. 2,865,897; Serial No. 377,713, filed August 31, 1953, now abandoned; Serial No. 381,-766, filed September 22, 1953, now abandoned; and Serial No. 392,511, filed November 16, 1953, now abandoned. This application is a division of Serial No. 776,449, filed November 26, 1958.

This invention relates to terephthalic acid diglycide esters which may be obtained in crystalline or liquid form, to resinous epoxy polymers of diglycide esters of terephthalic acid and to compositions of these various diglycide esters and resinous polymers thereof with hardeners.

It is an object of this invention to provide new and improved terephthalic acid diglycide esters in crystalline and raw, liquid form and also resinous epoxy polymers from these diglycide esters, which polymers contain these diglycide esters.

It is a further object of this invention to provide new resinous compositions useful as adhesives and molding resins containing the terephthalic acid diglycide esters and resinous polymers thereof with various acid and alkaline hardeners.

A further object of this invention is to provide molding composition of crystalline terephthalic acid diglycide ester and crystalline hardeners which compositions can be $$CH_2{-}\overset{O}{\overset{\diagup\diagdown}{}}\!{-}CH{-}CH_2{-}OOC{-}R\!\left[-COOCH_2{-}\overset{OH}{\underset{|}{C}}H{-}CH_2{-}O{-}CH_2{-}\overset{OH}{\underset{|}{C}}H{-}CH_2OOCR\right]_n\!-COO{-}CH_2{-}CH\overset{O}{\overset{\diagup\diagdown}{}}\!CH_2$$

stored indefinitely and readily harden to form adhesives and molded resins upon heating.

Other objects of this invention and advantageous features thereof will become apparent as the description proceeds.

In our copending application Serial No. 380,133 we disclose that terephthalic acid diglycide ester can be obtained by reacting dihalides of terephthalic acid with glycide in the presence of organic bases. The terephthalic acid diglycide ester can be readily separated from the reaction product in crystallized form. However, if volatiles such as the solvent, and especially unreacted glycide, are distilled off from the reaction mixture, resinous condensation products of the terephthalic acid diglycide ester condensed with (1) itself, (2) the unreacted glycide, (3) water and (4) other impurities are obtained. Especially suitable as the halides for this reaction are the chlorides and bromides. The chlorides are preferable as they are readily available and comparatively inexpensive.

The organic bases which are present during the reaction serve the purpose of binding the hydrogen halide liberated during the reaction between the terephthalic acid halide and the glycide, and must therefore be employed in approximately equivalent or stoichiometric amounts. Primarily useful as organic bases are tertiary organic nitrogen bases such as tri-methyl amine, tri-ethyl amine, pyridine and dimethylaniline.

The reaction generally proceeds in the cold; that is, at temperatures of 0° C. on upwards to room temperature. After commencement, the reaction can be accelerated or brought to greater completion by mild heating to temperatures up to 80° C., but it is preferable to maintain the temperature below 60° C. In general, the reaction is carried out in the presence of low-boiling organic solvents, especially those aromatic in nature such as benzene, toluene or xylene.

The diglycide ester of terephthalic acid is formed during the reaction according to the following equation:

$$R\!\!\begin{array}{c}COCl\\ \\COCl\end{array} + 2CH_2\overset{O}{\overset{\diagup\diagdown}{}}\!CH{-}CH_2OH + 2NR'_3 \longrightarrow$$

$$CH_2\overset{O}{\overset{\diagup\diagdown}{}}\!CH{-}CH_2OOC{-}R{-}COOCH_2{-}CH\overset{O}{\overset{\diagup\diagdown}{}}\!CH_2 + 2NR'_3\cdot HCl$$

where R is the terephthalic moiety and R' is a radical attached to the tertiary amine nitrogen. If it is desired to obtain the ester in more or less pure form, the solution is either cooled to temperatures at which the ester separates out, for example to temperatures from 0° to −20° C., or the solvent is distilled off, which is preferably accomplished under less than atmospheric pressure. After distilling off the solvent, a raw technical-grade product is obtained which still contains certain quantities of unreacted glycide and side products of unknown structure which are formed during the reaction. If the glycide is distilled off under a vacuum, more side products are formed from the terephthalic acid diglycide ester, the structures of which are unknown, but which are in all probability formed by a reaction between the terephthalic acid diglycide ester and unreacted glycide and/or by a reaction of such side products between themselves and with traces of moisture which may be present. Although nothing more accurate is known about the structures of these side products, the formation of two different groups of side products must be assumed as being probable. One group of side products probably has the general formula wherein $n$ is an integer from 0 to 3 and probably a number of approximately one, and R represents the terephthalic moiety. The other group of side products probably has the structural formula $$R\!\!\begin{array}{c}COOCH_2.X\\ \\COOCH_2.Y\end{array}$$

wherein X represents the following radicals:

—CHOH.CH$_2$OH

—CHOH.CH$_2$.O.CH$_2$.$\overset{O}{\overset{\diagup\diagdown}{}}$CH.CH$_2$

—CHOH.CH$_2$.O.CH$_2$.CHOH.CH$_2$OH

Y represent the following radicals:

—$\overset{O}{\overset{\diagup\diagdown}{}}$CH.CH$_2$

—CHOH.CH$_2$.O.CH$_2$.$\overset{O}{\overset{\diagup\diagdown}{}}$CH.CH$_2$ and R represents the terephthalic moiety. In addition to these side products, varying amounts of the terephthalic acid diglycide ester are also present in the condensation product.

Among the various epoxide compounds which would result from this removal of unreacted glycide are the following:

| | | Molecular weight | Epoxide oxygen content, percent | Hydroxyl number | Saponification number |
|---|---|---|---|---|---|
| (I) | COOCH$_2$—CH—CH$_2$ (epoxide) / C$_6$H$_4$ / COOCH$_2$—CH—CH$_2$ (epoxide) | 278 | 11.5 | 0 | 403 |
| (II) | COOCH$_2$—CHOH—CH$_2$OH / C$_6$H$_4$ / COOCH$_2$—CH—CH$_2$ (epoxide) | 296 | 5.4 | 380 | 380 |
| (III) | { COOCH$_2$—CHOH—CH$_2$—O—CH$_2$—CH—CH$_2$ (epoxide) / C$_6$H$_4$ / COOCH$_2$—CHOH—CH$_2$OH ; COOCH$_2$—CHOH—CH$_2$—O—CH$_2$—CHOH—CH$_2$OH / C$_6$H$_4$ / COOCH$_2$—CH—CH$_2$ (epoxide) } | 370 | 4.3 | 454 | 303 |
| (IV) | COOCH$_2$—CHOH—CH$_2$—O—CH$_2$—CH—CH$_2$ (epoxide) / C$_6$H$_4$ / COOCH$_2$—CHOH—CH$_2$—O—CH$_2$—CH—CH$_2$ (epoxide) | 426 | 7.5 | 264 | 264 |
| (V) | COOCH$_2$—CH—CH$_2$ (epoxide) / C$_6$H$_4$ / COOCH$_2$—CHOH—CH$_2$—O—CH$_2$—CH—CH$_2$ (epoxide) | 352 | 9.1 | 159 | 309 |
| (VI) | COOCH$_2$—CHOH—CH$_2$—O—CH$_2$—CHOH—CH$_2$OH / C$_6$H$_4$ / COOCH$_2$—CHOH—CH$_2$—O—CH$_2$—CH—CH$_2$ (epoxide) | 444 | 3.6 | 505 | 253 |
| (VII) | COOCH$_2$—CHOH—CH$_2$—O—CH$_2$—CHOH—CH$_2$OOC—C$_6$H$_4$—COOCH$_2$—CH—CH$_2$ (epoxide) / C$_6$H$_4$ / COOCH$_2$—CH—CH$_2$ (epoxide) | 574 | 5.6 | 195 | 391 |

The presence of all of these compounds having different structures imparts a resinous character to the product obtained by distilling off the glycide, which product, as stated above, also still contains unchanged terephthalic acid diglycide ester.

All of the products obtainable in accordance with the present invention contain on the average more than 1 and at most 2 epoxide oxygen atoms per molecule, and are therefore hardenable into completely insoluble and unmeltable resins. The raw technical-grade reaction product which is obtained after distilling off the solvent may also be used for this purpose. Since this product still contains a little glycide, the average molecular weight of this raw product is somewhat smaller than the theoretical molecular weight (278) of the terephthalic acid diglycide esters. For example, the average molecular weight of this product may drop as low as 200 and is preferably from 230 to 250. Resinous condensation products such as are obtained by distilling off the glycide from the reaction mixture, however, have a much higher average molecular weight: their average molecular weight may be as high as 500. The average epoxide content drops correspondingly: it may assume any desired value between the theoretical value for terephthalic acid diglycide ester (11.5% by weight) and 3.0% by weight, and is preferably at least 5.0% by weight. Of particular interest are products having an average epoxide oxygen content of 7.0% by weight or higher. These resinous condensation products have an average saponification number between 390 and 450.

The epoxide-oxygen content of the reaction product is determined in a manner known per se by titrating the hydrochloric acid which is consumed by reacting the epoxide with a hydrochloric acid-pyridine solution or with a hydrochloric acid-dioxane solution.

The molecular weight is determined cryoscopically. The values found and given refer to the entire reaction product obtained in each given case.

All of these diglycide esters and their condensation products are useful as intermediates in the preparation of adhesives, casting or potting resins and in the artificial fiber industry.

All of these products obtained in accordance with the invention may be employed with hardeners for the production of hardenable products, provided they contain on the average more than 1 and at most 2 epoxide groups in the molecule. Hardeners which may be employed for this purpose are both the acidic and alkaline hardeners. Among the acidic hardeners are, for example, anhydrides of hydrocarbon di- and polycarboxylic acids with 4 to 20 carbon atoms, preferably with 4 to 10 carbon atoms. Such compounds include, for example, the anhydrides of maleic acid, adipic acid, sebacic acid, phthalic acid, terephthalic acid, tetrahydrophthalic acid, etc. In addition, the adducts formed by the addition of 1 to 2 mols of maleic acid anhydride to 1 mol of dipentene may be used as hardeners. For alkaline or basic hardening, organic nitrogen bases which contain primary, secondary or tertiary nitrogen atoms once, twice or several times in the molecule, and containing at least one amino radical having at least one hydrogen atom bonded to the nitrogen atom, may be used as hardeners. Examples of such compounds are ethylene diamine, diethylene triamine, triethylene tetramine, piperidine, dicyandiamide, diacetoneamine, benzidine, p,p'-diaminediphenyl methane, reaction products formed by aliphatic polyamines with dicyandiamide, and others.

For purposes of hardening, a mixture is formed with the crystalline or technical-grade terephthalic acid diglycide ester, or the resinous condensation product as described, and the hardener. If both of these substances are solids, they can be pulverized and intimately admixed. If both of them are liquids, they are merely poured together. If one of the two substances is a liquid and the other a solid, the substances may be admixed with each other and the mixture heated until everything is in the molten state. This method may, of course, also be applied to obtain admixture of said glycide ester with a solid hardener.

The hardeners are generally used in quantities ranging from 5% to 60% by weight based upon the total weight of the mixture of glycide ester and hardener. For each mixture of glycide ester and any particular hardener there is a certain relatively narrow range within which optimum values can be reached. For small additions of hardeners within the range of 5 to 10% by weight, amines are preferably used.

In order to harden with the organic carboxylic acid anhydrides, it is necessary to heat the mixture to temperatures within the range of 80 to 200° C., preferably between 100 and 180° C. The basic amine hardeners effect a hardening action at much lower temperatures, preferably at room temperature, but such mixtures can also be hardened or post-hardened at elevated temperatures. Quite generally—that is, in the case of organic carboxylic acid anhydride hardeners as well as in the case of basic amine hardeners—an improvement in the mechanical properties of the hardened resin can be achieved by post-hardening at the hardening temperature or at temperatures above the hardening temperature.

The glycide esters according to the present invention may, in admixture with hardeners, be used as adhesives for a variety of materials, such as paper, cardboard, wood or other cellulose-containing materials, textiles, porcelain, stoneware or other ceramic materials, glass, metals such as iron, aluminum, copper, etc. They may be used as adhesives between identical materials as well as between different materials.

In addition, the glycide esters according to the present invention may, together with hardeners, be used as molding resins. These molding resins may either be used to produce shaped objects having a relatively complicated structure such as are difficult to obtain by other means, or may be used to fill empty spaces in apparatus of all types. This last process is often used for fixing connections of electrical cables. For example, entire circuits or electrical apparatus which include a great number of soldered connections may be molded with hardenable resin mixtures according to the present invention, so that upon hardening of the resin mixture a resin block is formed in which the electrical cables are protected from rupture or mechanical damage.

The particular advantage of the diglycide ester derivatives of terephthalic acid and of the hardened resins obtained therefrom is their high temperature resistance. In addition, if purified, preferably crystallized, terephthalic acid diglycide esters have been used for the production of the resins, the hardened products also have a very light color.

The following examples serve to illustrate this invention without, however, limiting the same thereto:

*Example 1*

206 gm. of symmetric phthalic acid (terephthalic acid) dichloride are allowed to run into a mixture of 150 gm. of glycide, 225 gm. of triethylamine, and 600 cc. of toluene over a period of about one hour, while cooling thoroughly and stirring. Stirring is continued for a further hour, the precipitated chlorohydrate is filtered off and is washed with toluene. Toluene is removed from the filtrate by weighs 290 gm. by distillation at a bath temperature up to 160° C. and at a vacuum of about 10 mm. mercury. The residue (230 gm.) has the following characteristic properties and analytical values:

| | | |
|---|---|---|
| Epoxide-oxygen content | percent | 8.1 |
| Nitrogen content | do | 0.87 |
| Chlorine content | | Traces |
| Saponification number | | 394 |
| Molecular weight | | 250 |

On distilling said product, finally at a bath temperature of 190° C. and in a vacuum of 0.7 mm. mercury until no further distillate is obtained, 220 gm. of a dark resin which is highly viscous at room temperature are obtained as residue. Said resin has the following characteristic properties and analytical values:

| | |
|---|---|
| Epoxide-oxygen content _____ percent __ | 7.0 |
| Nitrogen content _____ do ____ | 1.4 |
| Chlorine content _____ do ____ | Traces |
| Saponification number _____ | 420 |
| Molecular weight _____ | 480 |

*Example II*

A solution of 20.6 gm. of pure terephthalic acid chloride in 100 cc. of benzene is added drop by drop to a mixture of 15 gm. of glycide and 23 gm. of triethylamine at 0–5° C. over a period of 1½ hours while cooling and stirring. Stirring is continued for 2 further hours while the temperature of the reaction mixture is allowed to increase to room temperature. 29 gm. of precipitated triethylamine hydrochloride are filtered off, preferably after standing overnight and the benzene is distilled off in a vacuum until crystals start to precipitate. Crystallization may be enhanced by the addition of petroleum ether. The resulting diglycide ester of terephthalic acid is readily recrystallized from a mixture of equal parts of benzene and petroleum ether. Said ester melts at 108–109° C. The yield exceeds 80% of the theoretical yield.

*Analytical data:*

| | Found | Calculated for $C_{14}H_{14}O_6$ |
|---|---|---|
| Epoxide-oxygen content, percent _____ | 11.7 | 11.5 |
| Carbon, percent _____ | 60.65 | 60.4 |
| Hydrogen, percent _____ | 5.2 | 5.0 |

*Example III*

21 gm. of terephthalic acid dichloride and 22 gm. triethylamine are admixed with 200 gm. toluene. After cooling the mixture to 0° C., 16 gm. glycide are slowly added dropwise while maintaining the mixture between 0° C. and +5° C. After the principal reaction has subsided, the mixture is heated to 40 to 50° C. and after reaching that temperature is admixed with 70 cc. water at 50° C., whereby an emulsion is first formed. After separating the emulsion, the toluene layer which contains the reaction product is dried. By cooling the toluene solution to temperatures below 0° C., about 19 gm. of technically pure terephthalic acid diglycide ester are obtained. After filtering off the glycide ester, the toluene is evaporated at 10 mm. mercury and at temperatures up to 160° C. The terephthalic acid diglycide ester remains behind as the evaporated residue in the form of a technical-grade raw product. If it is desired to obtain the ester in pure form, the technical grade raw product may be recrystallized as in the preceding examples. The product thus obtained has a melting point of 106 to 110° C.

In place of the pure glycide, a mixture of glycide and epichlorohydrin may also be used such as is obtained by reacting phthalic acid metal salts with epichlorohydrin. Such mixtures, for example, contain 30 to 35% glycide and they are used in quantities such that the absolute amount of glycide required for the reaction is present.

The following examples describe the technical use of the products obtained in accordance with the previous examples in conjunction with hardening the same into unmeltable and organic solvent-insoluble resins. Even though the following examples describe the further treatment of a product in accordance with one of the preceding examples, it must nevertheless be taken into consideration that each of the products in the preceding examples may be used for the particular purpose. For the purpose of hardening, the pure crystallized terephthalic acid diglycide ester, the technical-grade raw product terephthalic acid diglycide ester, or the resinous condensation product of the terephthalic acid diglycide ester can be mutually exchanged for each other and, except for minor variations, substantially the same results are obtained.

*Example IV*

2 parts by weight of the resinous condensate obtained according to Example I and having an epoxide-oxygen content of 7.0% by weight and a molecular weight of 480 are intimately admixed with 0.2 part by weight of dibutyl phthalate and 0.2 part of diethylenetriamine. This mixture is applied to duraluminum sheets and these sheets are joined for the purpose of forming an adhesive bond, the adhesive joint or overlap being 2 cm.² After standing for 24 hours at room temperature, the adhesive bond has a shear strength of 1.4 kg./mm.²

*Example V*

2 parts by weight of the resinous condensate obtained according to Example I and having an epoxide-oxygen content of 7.0% by weight and a molecular weight of 480 are intimately mixed with 0.6 part by weight of maleic acid anhydride. This mixture hardens at 130° C. within 5 to 10 minutes. Shearing resistance values of 2.6 to 2.8 kg./mm.² are determined for adhesive bonds between aluminum sheets after completely hardening the cemented sheets at 130° C. for 6 hours.

*Example VI*

2 parts by weight of the resinous condensate obtained by a process similar to that described in Example I and having an epoxide-oxygen content of about 4% and a molecular weight of about 300 are intimately mixed with 0.6 part by weight of maleic acid anhydride. This mixture is melted together and the resulting adhesive composition is used for cementing duraluminum sheets. The resulting adhesive bond, after hardening at 130° C., has a shearing resistance of 2.9 to 3.2 kg./mm.²

*Example VII*

80 parts by weight of the crystallized terephthalic acid diglycide ester obtained in accordance with Example II are finely pulverized and admixed with 20 parts by weight of finely pulverized terephthalic acid anhydride. The mixture of these two powders is then heated to a temperature of 80 to 90° C., whereupon it melts. The melted mixture is then applied in thin layers on aluminum sheets which are lightly pressed together and exposed for 8 hours to a temperature of 150° C. The terephthalic acid diglycide ester hardens thereby and forms an adhesive bond, having high shear strength between the aluminum sheets. It is particularly noteworthy that this adhesive bond remains very strong even at relatively high temperatures. Given an adhesive surface of 2 cm.², a shear strength of 3.5 kg./mm.² is measured at 110° C., and at a temperature of 130° C. the shear strength of the adhesive bond is found to be 3 kg./mm.²

*Example VIII*

The procedure described in the preceding example is repeated but in place of the terephthalic acid anhydride the following hardeners are used. The quotient in parentheses indicates the quantitative ratio of ester to hardener.

Benzidine (10:2.5)
Tetrahydrophthalic acid anhydride (2:1)
p,p'-diaminodiphenylmethane (10:2.5)

When benzidine and tetrahydrophthalic acid anhydride are used, the shear strength values are at least as great as in the preceding example. When p,p'-diaminodiphenylmethane is used, even higher temperature resistance values are achieved.

*Example IX*

A mixture of 10 parts by weight of crystallized terephthalic acid diglycide ester and 2.5 parts by weight of p,p'-diaminodiphenylmethane are admixed and the mixture is melted by heating it to 70 to 80° C. The relatively thin melt remains liquid for several hours at the indicated temperature. During this time, it is poured into molds where it gradually hardens at the indicated temperature. The hardening action can be highly accelerated by heating to still higher temperatures; for example, to temperatures from 120 to 180° C. The molded object thus obtained exhibits a high temperature resistance and shrinks very little as compared to the dimensions of the mold.

*Example X*

Crystallized terephthalic acid diglycide ester is admixed with various hardeners, and the mixtures are melted and poured into molds having dimensions of 12 x 1.5 x 1 cm. The mixtures are then hardened in these molds. Thereafter, the Martens temperature, the impact bending strength, the Brinell hardness and the linear shrinkage of the molded objects are determined. The following table shows the composition of the mixtures, the hardening conditions and the test results.

TABLE

MOLDING RESINS FROM TEREPHTHALIC ACID DIGLYCIDE ESTER

| No. | Composition (parts by weight terephthalic acid diglycide ester (T.G.E.) and parts by weight hardener) | Hardening | Martens temperature, ° C. | Impact bending strength, cm. kg./ cm.² | Brinell hardness | Linear shrinkage, mm./ 120 mm. |
|---|---|---|---|---|---|---|
| 1 | 2 parts T.G.E. according to Example III, 1 part tetrahydrophthalic acid anhydride. | 16 hrs at 140° C. | 89-92 | 13-20 | 1,224 | 2.5 |
| 2 | 2 parts T.G.E. according to Example III, 1 part maleic acid anhydride. | 16 hrs at 140° C. | 66-72 | 12 | 1,272 | 2.5 |
| 3 | 20 parts T.G.E. according to Example II 1 part p,p'-diaminodiphenylmethane | 16 hrs at 140° C. 2 hrs at 180° C. | 81-82 78 | 8-11 7 | 884 1,326 | 1.7 1.6 |
| 4 | 20 parts T.G.E. according to Example II 5 parts benzidine | 16 hrs at 140° C. 3 hrs at 180° C. | 123 110 | 16 22 | 1,224 1,446 | 1.9 1.5 |
| 5 | 20 parts T.G.E. (recrystallized twice) 5 parts benzidine | 16 hrs at 140° C. 3 hrs at 180° C. | 173 176 | 24 18 | 1,230 1,326 | 0.4 0.7 |

While we have set forth certain theories in order to better explain our invention and have given what we believe to be the structural formula of some of the products in the resinous condensates produced according to our invention, it is to be understood that we are not bound by these theories or the structural formulas set forth, and also that various changes and modifications may be made in the examples of our invention given for the purpose of illustration only, all within the spirit of our invention and the scope of the following claims.

We claim:

1. A substantially water-insoluble composition containing a mixture of monomeric and lower molecular weight polymeric epoxy ester compounds formed by condensing terephthalic acid halides with glycide, said epoxy ester compounds containing at least one epoxide group and not more than two epoxide groups per individual molecules, the glycide radical being linked to the terephthalic acid radical through a linkage selected from the group consisting of (1) ester linkages and (2) ether linkages to a glycerine radical linked to said terephthalic acid radical through an ester linkage, said composition having an average epoxide-oxygen content between 3.0% and 11.5%, an average molecular weight between 200 and 500, and an average saponification number between 390 and 450 and said composition being hardenable by epoxy resin hardeners.

2. A substantially water-insoluble composition containing a mixture of monomeric and low molecular weight polymeric epoxy ester compounds, said mixture containing primarily compounds selected from the group consisting of

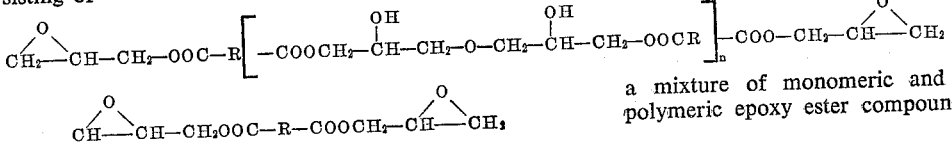

and

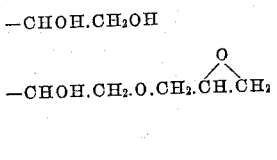

wherein $n$ is an integer from 0 to 3 and has an average value about 1.0, R is a bivalent radical derived from the terephthalic acid moiety, X is selected from the group consisting of $$-CHOH.CH_2OH$$

$$-CHOH.CH_2.O.CH_2.\overset{O}{\overset{\triangle}{CH.CH_2}}$$

and $$-CHOH.CH_2.O.CH_2.CHOH.CH_2OH$$

radicals, and Y is selected from the group consisting of

and $$-CHOH.CH_2.O.CH_2.\overset{O}{\overset{\triangle}{CH.CH_2}}$$

radicals, said composition having an average epoxide-oxygen content between 3.0% and 11.5%, an average molecular weight between 200 and 500, and an average saponification number between 390 and 450 and said composition being hardenable by epoxy resin hardeners.

3. A hardenable resinous composition comprising (a) a mixture of monomeric and lower molecular weight polymeric epoxy ester compounds formed by condensing terephthalic acid halides with glycide, said epoxy ester compounds containing at least one epoxide group and not more than two epoxide groups per individual molecules, the glycide radical being linked to the terephthalic acid radical through a linkage selected from the group consisting of (1) ester linkages and (2) ether linkages to a glycerine radical linked to said terephthalic acid radical through an ester linkage, said epoxy ester compounds having an average epoxide-oxygen content between 3.0% and 11.5%, an average molecular weight between 200 and 500, and an average saponification number between 390 and 450, and (b) from about 5% to about 60% by weight, based upon the total weight of the composition, of a curing agent selected from the group consisting of acidic and alkaline curing agents.

4. A hardenable resinous composition comprising (a) a mixture of monomeric and low molecular weight polymeric epoxy ester compounds, said mixture having a substantial amount of compounds selected from the group consisting of

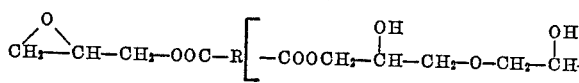

and

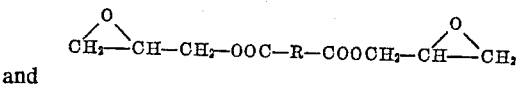

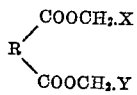

wherein $n$ is an integer from 0 to 3 and has an average value about 1.0, R is a bivalent radical derived from the terephthalic acid moiety, X is selected from the group consisting of

—CHOH.CH$_2$OH

and

—CHOH.CH$_2$.O.CH$_2$.CHOH.CH$_2$OH radicals, and Y is selected from the group consisting of

and

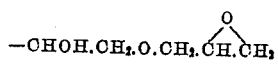

radicals, said epoxy ester compounds having an average epoxide-oxygen content between 3.0% and 11.5%, an average molecular weight between 200 and 500, and an average saponification number between 390 and 450, and (b) from about 5% to about 60% by weight, based upon the total weight of the composition, of a curing agent selected from the group consisting of acidic and alkaline curing agents.

5. A hardenable powdered resinous composition comprising (a) terephthalic acid diglycide ester and (b) from about 5% to about 60% by weight, based on the total weight of the composition, of a solid curing agent selected from the group consisting of acidic and alkaline curing agents.

6. A hardenable powdered resinous composition comprising (a) crystalline terephthalic acid diglycide ester and (b) about 20% by weight, based upon the total weight of the composition, of solid terephthalic acid polyanhydride.

7. A hardenable powdered resinous composition comprising (a) crystalline terephthalic acid diglycide ester and (b) about 20% by weight, based upon the total weight of the composition, of crystalline benzidine.

References Cited in the file of this patent
UNITED STATES PATENTS

| | | |
|---|---|---|
| 1,860,098 | Jaeger | May 24, 1932 |
| 2,781,333 | Updegraff | Feb. 12, 1957 |
| 2,801,232 | Suen | July 30, 1957 |
| 2,895,947 | Shokal | July 21, 1959 |

FOREIGN PATENTS

| | | |
|---|---|---|
| 500,300 | Great Britain | Feb. 7, 1939 |
| 518,057 | Great Britain | Feb. 15, 1940 |

OTHER REFERENCES

Kester et al.: Journal of Organic Chemistry, vol. 8, pages 550–556 (1943).

UNITED STATES PATENT OFFICE
CERTIFICATE OF CORRECTION

Patent No. 3,073,804                      January 15, 1963

Bernhard Raecke et al.

It is hereby certified that error appears in the above numbered patent requiring correction and that the said Letters Patent should read as corrected below.

Column 5, line 68, for "said" read -- solid --; column 9, line 74, the formula should appear as shown below instead of as in the patent:

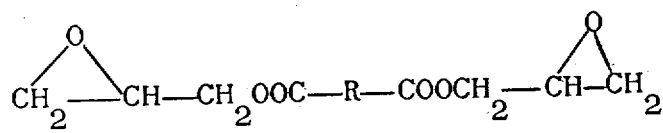

Column 10, line 44, the formula should appear as shown below instead of as in the patent:

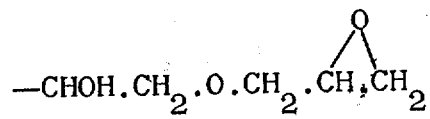

Signed and sealed this 27th day of August 1963.

SEAL)
Attest:
ERNEST W. SWIDER
Attesting Officer

DAVID L. LADD
Commissioner of Patents